(12) United States Patent
Fujiyoshi

(10) Patent No.: US 6,327,008 B1
(45) Date of Patent: Dec. 4, 2001

(54) COLOR LIQUID CRYSTAL DISPLAY UNIT

(75) Inventor: Tatsumi Fujiyoshi, Miyagi-ken (JP)

(73) Assignees: LG Philips Co. Ltd., Seoul (KR); Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 08/760,539

(22) Filed: Dec. 5, 1996

(30) Foreign Application Priority Data

Dec. 12, 1995 (JP) .................................................. 7-323386

(51) Int. Cl.⁷ .......................... G02F 1/1335; G02F 1/141; G09F 3/36
(52) U.S. Cl. .................. 349/106; 349/37; 345/96
(58) Field of Search .................... 345/96; 349/33, 349/37, 106

(56) References Cited

U.S. PATENT DOCUMENTS 5,107,353  *  4/1992   Okumura ............................. 345/96
5,457,552  *  10/1995  Ogurtsov et al. .................... 349/106
5,606,437  *  2/1997   Mosier ................................. 349/106
5,648,793  *  7/1997   Chen .................................... 345/96

FOREIGN PATENT DOCUMENTS 6-105387    12/1994    (JP) .

* cited by examiner

*Primary Examiner*—Toan Ton
(74) *Attorney, Agent, or Firm*—Brinks Hofer Gilson & Lione

(57) ABSTRACT

In a color liquid crystal display unit capable of making oblique stripes in a beat noise form inconspicuous, interlaced driving is adopted, a color filter having colors different for each dot is used, the color arrangement in the color filter is distributed uniformly over the entire frame, and nearby dots in the same color is driven by driving voltage having different polarity in the same field.

3 Claims, 11 Drawing Sheets

FIG. 3A
THE FIRST FIELD OF
THE FIRST FRAME
FIG. 3B
THE SECOND FIELD OF
THE FIRST FRAME
FIG. 3C
THE FIRST FIELD OF
THE SECOND FRAME
FIG. 3D
THE SECOND FIELD OF
THE SECOND FRAME
 POSITIVE WRITE
 NEGATIVE WRITE

FIG. 5A
THE FIRST FIELD OF
THE FIRST FRAME
FIG. 5B
THE SECOND FIELD OF
THE FIRST FRAME
FIG. 5C
THE FIRST FIELD OF
THE SECOND FRAME
FIG. 5D
THE SECOND FIELD OF
THE SECOND FRAME
 POSITIVE WRITE
 NEGATIVE WRITE

FIG. 10A

| + | − | + | − | + |
|---|---|---|---|---|
| + | − | + | − | + |
| + | − | + | − | + |
| + | − | + | − | + |
| + | − | + | − | + |

FIG. 10B

| + | + | + | + | + |
|---|---|---|---|---|
| − | − | − | − | − |
| + | + | + | + | + |
| − | − | − | − | − |
| + | + | + | + | + |

FIG. 11

| + | − | + | − | + |
|---|---|---|---|---|
| − | + | − | + | − |
| + | − | + | − | + |
| − | + | − | + | − |
| + | − | + | − | + |

THE FIRST FIELD OF
THE FIRST FRAME

THE SECOND FIELD OF
THE FIRST FRAME

THE FIRST FIELD OF
THE SECOND FRAME

THE SECOND FIELD OF
THE SECOND FRAME

FIG. 16A PRIOR ART

THE FIRST FIELD OF
THE FIRST FRAME

FIG. 16B PRIOR ART

THE SECOND FIELD OF
THE FIRST FRAME

FIG. 16C PRIOR ART

THE FIRST FIELD OF
THE SECOND FRAME

FIG. 16D PRIOR ART

THE SECOND FIELD OF
THE SECOND FRAME

▨ POSITIVE WRITE
○ NEGATIVE WRITE

COLOR LIQUID CRYSTAL DISPLAY UNIT

BACKGROUND OF THE INVENTION

1. Field of the Invention

The present invention relates to a technique of making oblique stripes in a beat noise form generated when interlaced driving of a liquid crystal inconspicuous by devising the arrangement of a micro color filter in a color liquid crystal display unit.

2. Description of the Related Art

In the National Television System Committee (NTSC) system known as one of standard systems of television, the number of scanning lines of 525 and 30 frames per second are adopted. In general, however, in order to reduce blinking of a picture called flicker, interlaced scanning is employed in which one frame is divided into two parts, an even-numbered field and an odd-numbered field, and respective fields are scanned in a consecutive order so as to scan them alternately.

When the interlaced scanning is performed, an even-numbered scanning line is displayed in an even-numbered field and an odd-numbered scanning line is displayed in an odd-numbered field. By doing so, it is possible to double an apparent scanning cycle, and the flicker becomes inconspicuous. Further, since the actual effective frame is approximately 480 lines in the number of scanning lines and is approximately 80% in the horizontal direction, the pixel structure is manufactured as one having 480×640 in full resolution products, what is called a 480-line structure, and as one having approximately 240×400 in half resolution products (only half of the number of scanning lines is used), what is called a 240-line structure in a general liquid crystal display unit. Further, a system that adopts the interlaced scanning in a liquid crystal display unit is to be called an interlaced driving system here.

Here, the scan driving indicates that a pixel line in a certain direction is selected and a display signal is applied to that line. In a liquid crystal display unit, however, when direct-current driving is performed when a signal is applied, ions in the liquid crystal are accumulated in a substrate on one side and liable to cause deterioration of the display unit.

Therefore, in order to prevent such a problem, the display signal applied to the liquid crystal is inverted in polarity positive to/from negative for every field in driving.

Further, in the interlaced scanning in a television of the NTSC system, one frame (one scope) is constituted by putting the odd field (the first field) and the even field (the second field) together, but a field frequency is set to 60 Hz and a frame frequency is set to 30 Hz in general.

The scan driving state is shown in FIG. 6. In FIG. 6, numerical numbers (23 to 263) on the left side show scanning line numbers in the first field, and numerical numbers (285 to 525) on the right side show scanning line numbers in the second field. Besides, the fact that the scanning line is shown to decline from left to right means that scanning is performed from the upper left part to the lower right part following scanning lines running from the top to the bottom of the frame, thus forming a picture of one frame or one field.

As against the above, in a liquid crystal display unit in the present state a typical television picture display state of 240 lines is driven by a single line sequential driving system in which, as shown in FIG. 7, a write frequency is set to 60 Hz, scanning signals of the first field are set to the numbers 23, 24, 25 to 260, 261 and 262, and scanning signals of the second field are set to the numbers 286, 287, 288 to 523, 524 and 525, thus writing signals in the first field and the second field putting them on the same scanning line.

Further, as shown in FIG. 8, as a display state of a typical television picture of 480 lines, the write frequency is set to 60 Hz, scanning signals of the first field are set to the numbers 23, 24 to 261 and 262, and scanning signals of the second field are set to the numbers 285, 286, 287 to 523, 524 and 525, for example, the signal having the scanning signal number 23 is written in two lines of the 1st line and the 2nd line that are adjacent above and below, and a signal having the next scanning signal number is written in two lines successively by the same method, thus forming the first field by repeating the foregoing sequentially, and, on the other hand, in the second field, the signals are written successively by the same technique in two lines with a different combination from that of two adjacent lines that have been written in the case of the first field, thus being driven by a double speed line sequential driving system capable of inputting a signal to respective lines at an apparently double speed.

However, it cannot be said that the NTSC signal is put to practical use sufficiently in the present state of things in the conventional single line sequential driving system or double speed line sequential driving system such as described previously.

When it is intended to directly introduce an interlaced driving system in which the scanning line numbers of the first field are set to 23, 24 to 261 and 262, the scanning line numbers of the second field are set to 286, 287 to 524 and 525, and a write frequency of 30 Hz is set in the signal write of the first field and the signal write of the second field in the 480-line liquid crystal display unit as shown in FIG. 9, the display of the liquid crystal has to be held for 1/30 second, but the following advantages and disadvantages are produced with the above.

First, as the advantages, the vertical resolution is improved due to numerous number of lines, and moreover, it is possible to aim at lower power consumption as compared with the double speed line sequential driving and so on and to aim at achievement of low cost. However, the lowering of contrast and the increase of flicker are anticipated by the influence that the time of holding the voltage of the liquid crystal gets longer.

Accordingly, in future development of the liquid crystal display, the development aiming to make the most of performance and design technique of the TFT in the present state while reproducing the picture information of the NTSC signal sufficiently.

Further, in a TFT color liquid crystal display unit in general, the scanning line and the signal line are arranged on the side of the TFT substrate, a common electrode is arranged on the side of the color filter substrate, the scanning signal is applied basically to the scanning line, and a corresponding display signal is sent in the signal line so as to perform an action as a matrix, and thus, the pixel realizes a high picture quality by a charge holding action.

When alternating current driving for inverting the polarity of the display signal in every field as described previously in such a TFT color liquid crystal display unit, the signal sent from the signal line is inverted and inputted to a pixel, but there have been several systems for inversion of a signal. Field inversion for inverting the voltage polarity of all the pixels into the same polarity in the unit of field has been known as the simplest inversion system, but it is practically impossible to make the applied voltage completely symmetrical between positive and negative polarities, thus inducing the flicker frequently.

Therefore, signal line inversion in which the inverted pixel unit is produced with respect to every signal line as shown in FIG. 10A, gate line inversion in which the inverted pixel unit is produced with respect to every scanning line as shown in FIG. 10B and so on are adopted, but a dot inversion system in which the pixel is inverted in every adjacent dot as shown in FIG. 11 is also adopted for the purpose of solving crosstalk and insufficient write better than those systems.

When the double speed line sequential driving system is replaced with the interlaced driving thereby to adopt the inversion driving shown in FIG. 12 by way of experiment in the 480-line liquid crystal display unit obtainable in the present state under such circumstances, it has been ascertained that 80>CR (contrast) is produced in a liquid crystal display unit which had 100>CR (contrast). It is conceived to be caused by such a reason that effective voltage practically applied to the liquid crystal has dropped because the write frequency gets longer (twice). With respect to this point, however, it is possible to solve this problem easily when a liquid crystal which is capable of obtaining the same transmittance characteristic at lower voltage (a liquid crystal corresponding to low $V_{th}$ (threshold voltage)) is adopted.

However, it has been found that, when a 480-line liquid crystal display unit is driven by interlaced driving, fluctuation in an oblique stripe form such as a beat noise which cannot be dissolved even by the inversion driving shown in FIG. 12 is visible. Then the cause of generation of such an oblique stripe was analyzed.

The analyzed liquid crystal panel is a TFT liquid crystal display panel, which has the display capacity of 480 lines and is driven interlacedly.

To be concrete, as shown in FIG. 13, a transparent substrate 8 provided with a plurality of TFT circuits 5 and pixel electrodes 6 and a deflecting plate 7 is arranged oppositely at a predetermined space against a transparent substrate 12 provided with a common electrode 9, a color filter 10 and a deflecting plate 11 and a liquid crystal is sealed in a gap 13 between both substrates 8 and 12, thereby to form a rough structure.

The TFT circuit 5 of a liquid crystal panel used in this analysis has a structure that, as shown in detail with an equivalent circuit shown in FIG. 14, a plurality of scanning lines 15 and signal lines 16 are formed in a matrix form, a TFT body 17, a liquid crystal 18 as capacity and a storage capacity 19 are connected in a region surrounded by respective lines, and the storage capacity 19 is connected to the scanning line 15.

Next, as to the color arrangement of respective dots in red, green and blue (described as RGB hereinafter) of a color filter of this type of TFT liquid crystal display panel, a color filter 20 in which respective colors of RGB are arranged in a mosaic pattern form declining obliquely from left to right as shown in FIG. 15A, a color filter 21 in which respective colors RGB are arranged in a mosaic pattern form declining obliquely from right to left as shown in FIG. 15B, a color filter 22 in a vertical stripe pattern form in which respective colors of RGB are arranged in one vertical line as shown in FIG. 15C, and a color filter 23 in which respective colors of RGB are arranged in a triangle pattern form as shown in FIG. 15D are known, but the color filter 21 in the arrangement state of the dots of RGB shown in FIG. 15B has been adopted in the color filter 10 used in this analysis.

The arrangement of driving voltage polarity in a display state of the micro color filter when the TFT liquid crystal panel having the above-mentioned structure is used and interlaced driving and inversion driving shown in FIG. 12 are performed is shown in the order of driving sequence as FIGS. 16A, 16B, 16C and 16D. In these figures, particular attention is paid to a pixel G of high visibility, and a state that positive write has been made in the black dot-painted portions of the dots G of the micro color filter and negative write has been made in the portions with round marks of the dots G of the micro color filter is shown.

As it is apparent from these figures, when interlaced driving or inversion driving in the sequence shown in FIG. 12 of the TFT liquid crystal panel is performed, asymmetry of the voltage applied to the pixel and transmittance variation of one dot from the driving frequency cannot be negated by the transmittance variation of pixels therearound, and conversely, it is visible as fluctuation in a stripe form obliquely declining from right to left in the color filter arrangement of the mosaic obliquely declining from right to left. Further, this type of fluctuation in a stripe form is similar also in other color filter arrangements mentioned previously.

SUMMARY OF THE INVENTION

The present invention has been made in view of the above-mentioned circumstances, and has for its object to provide a color liquid crystal display unit which is capable of making oblique stripes in a beat noise form of the color liquid crystal display unit inconspicuous in interlaced driving by devising specially the arrangement of colors of respective dots of a micro color filter.

According to the present invention, in order to solve the above-mentioned subject, there is provided a color liquid crystal display unit structured so that a TFT circuit is provided on a substrate on one side in substrates forming a pair, a common electrode and a color filter are provided on the other substrate, a liquid crystal is held between both substrates, the TFT circuit includes scanning lines and signal lines wired in a matrix form, and a TFT body and a pixel electrode are provided in a region surrounded by the scanning lines and the signal lines, in which one frame is divided into two parts, a first field and a second field, interlaced driving for scanning the respective fields sequentially so as to drive them alternately is adopted, the color filter has a plurality of micro color filters in three colors of red, green and blue, the color arrangement in the micro color filter is distributed uniformly over the entire display frame, and nearby dots in the same color are driven by driving voltage having different polarity in the same field.

It is desirable in the structure described above that two each of the dots in the same color are arranged successively with respect to the pixel of the same scanning line.

In the structure described above, it is desirable that the drawing up sequence of the dots in three colors along the alternate identical scanning lines is the same, the dots that are alternate and along the identical signal lines have the same color, and the drawing up sequence of the dots in three colors along remaining alternate identical scanning lines is shifted by one line from the drawing up sequence along the alternate identical scanning lines.

BRIEF DESCRIPTION OF THE DRAWINGS

FIG. 3A is a diagram showing the first field of the first frame explaining one arrangement of driving voltage polarity of the micro color filter shown in FIG. 1;

FIG. 3B is a diagram showing the second field of the first frame explaining the arrangement of driving voltage polarity of the micro color filter shown in FIG. 1;

FIG. 3C is a diagram showing the first field of the second frame explaining the arrangement of driving voltage polarity of the micro color filter shown in FIG. 1;

FIG. 3D is a diagram showing the second field of the second frame explaining the arrangement of driving voltage polarity of the micro color filter shown in FIG. 1;

FIG. 5A is a diagram showing the first field of the first frame explaining one arrangement of driving voltage polarity of the micro color filter shown in FIG. 4;

FIG. 5B is a diagram showing the second field of the first frame explaining the arrangement of driving voltage polarity of the micro color filter shown in FIG. 4;

FIG. 5C is a diagram showing the first field of the second frame explaining the arrangement of driving voltage polarity of the micro color filter shown in FIG. 4;

FIG. 5D is a diagram showing the second field of the second frame explaining the arrangement of driving voltage polarity of the micro color filter shown in FIG. 4;

Figures 10A, 10B, 11:
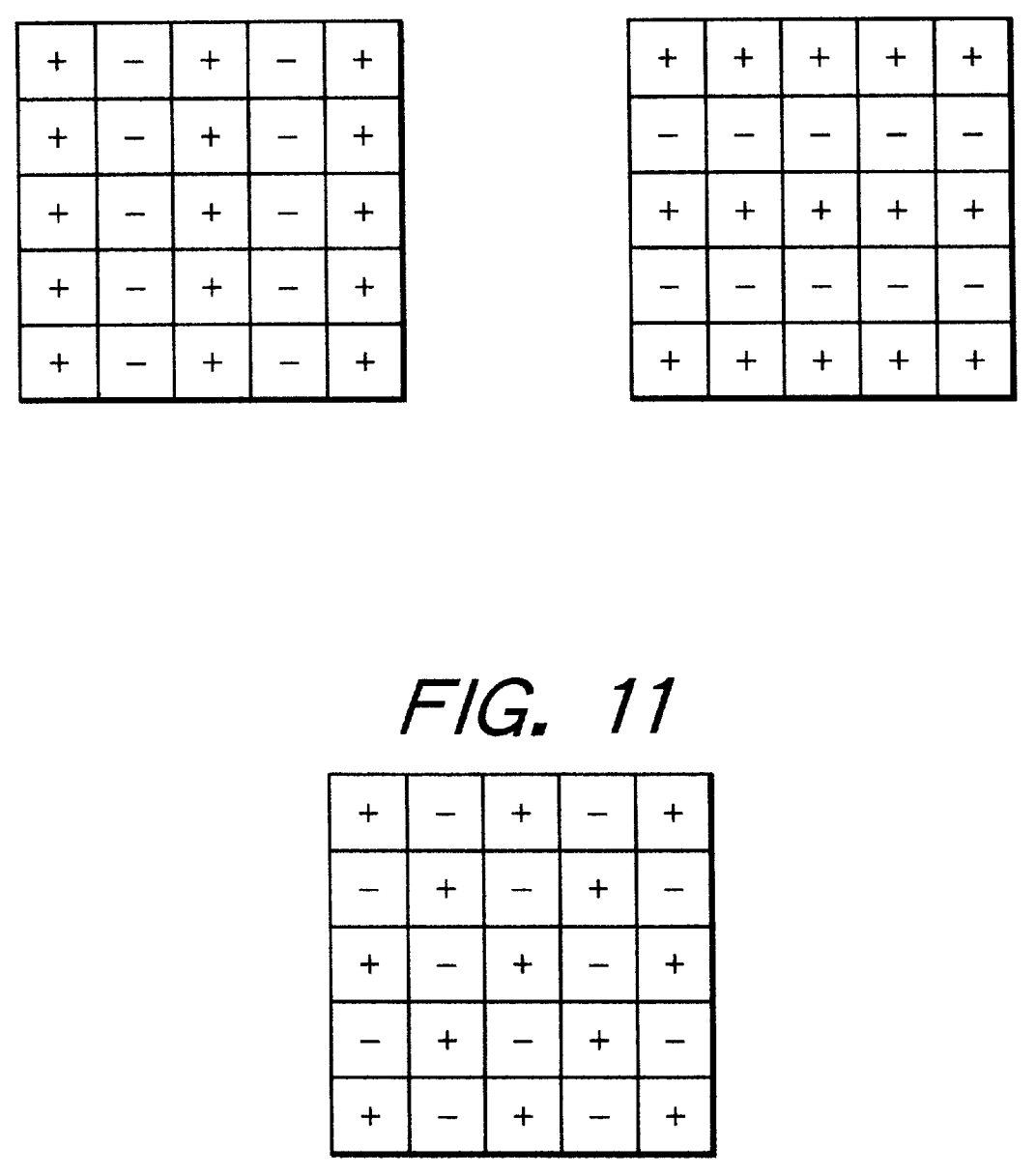

FIG. 10A is a diagram showing a state of a frame according to a signal line inversion system explaining an inversion system of liquid crystal driving voltage;

FIG. 10B is a diagram showing a state of a frame according to a gate line inversion system explaining an inversion system of liquid crystal driving voltage;

FIG. 11 is a diagram for explaining an inversion system of liquid crystal driving voltage, showing a state of a frame according to a dot inversion system;

FIG. 16A is a diagram showing the first field of the first frame explaining one arrangement of driving voltage polarity at time of interlaced driving;

FIG. 16B is a diagram showing the second field of the first frame explaining the arrangement of driving voltage polarity at time of interlaced driving;

FIG. 16C is a diagram showing the first field of the second frame explaining the arrangement of driving voltage polarity at time of interlaced driving; and FIG. 16D is a diagram showing the second field of the second frame explaining the arrangement of driving voltage polarity at time of interlaced driving.

DESCRIPTION OF THE PREFERRED EMBODIMENTS

Embodiments of the present invention will be explained hereinafter with reference to the drawings.

Figures 1, 2:
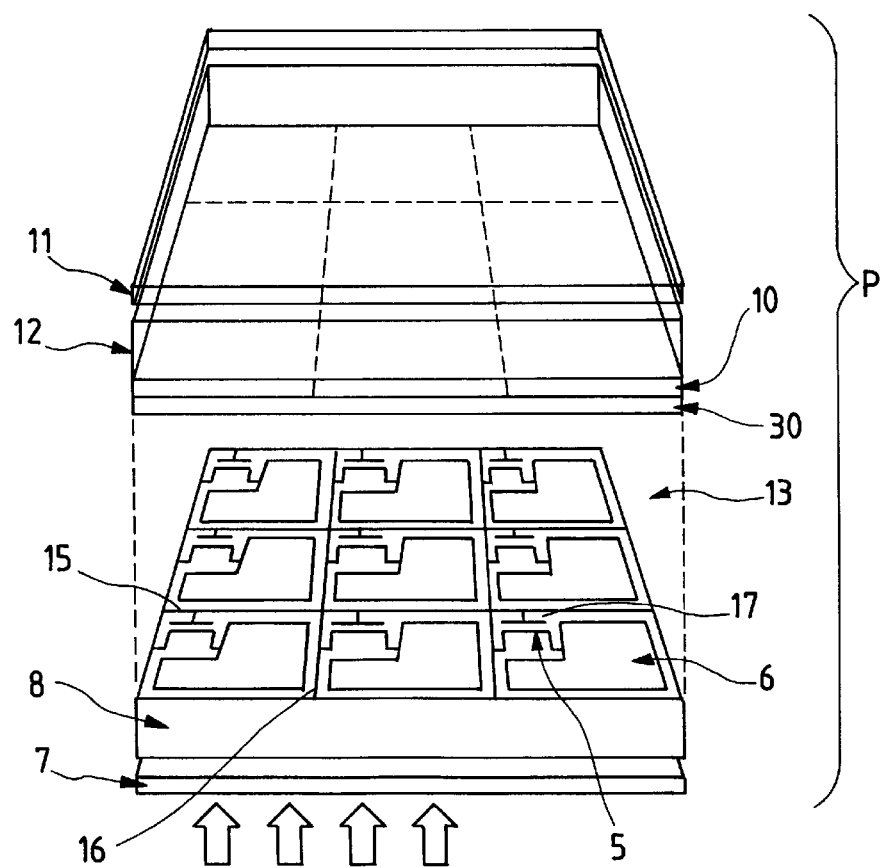
FIG. 1 is a plan view showing an example of a micro color filter according to the present invention.
FIG. 2 is an exploded perspective view showing an example of a TFT color liquid crystal display unit provided with the micro color filter shown in FIG. 1.
Figure 13:
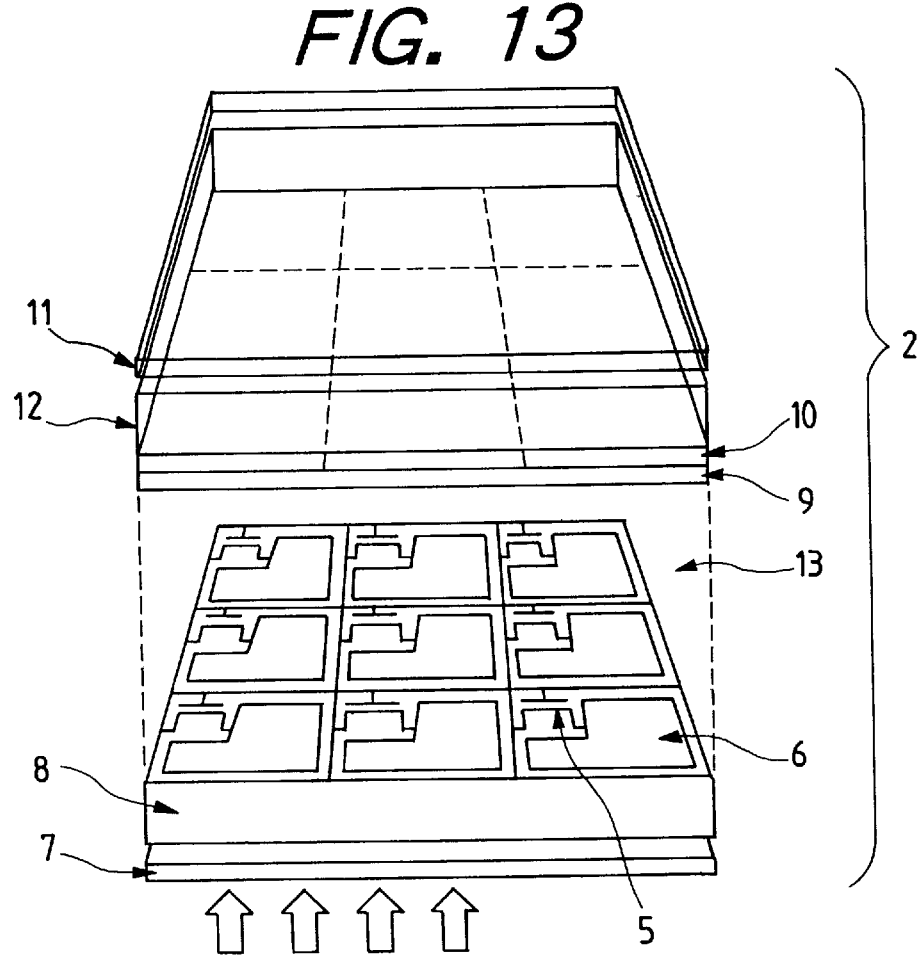
FIG. 13 is a diagram showing a structural example of a TFT liquid crystal display unit provided with a color filter.
Figure 14:
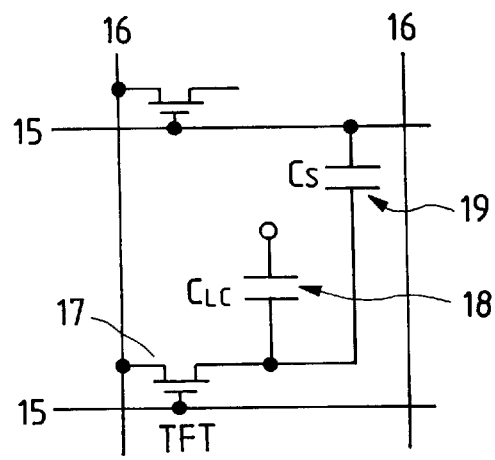
FIG. 14 is a diagram showing an example of an equivalent circuit of the TFT used in the TFT liquid crystal display unit shown in FIG. 13.
Figure 15A:
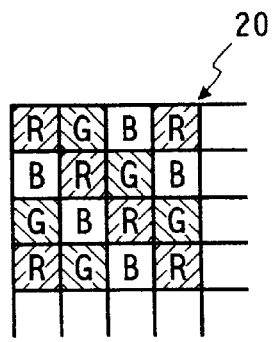
FIG. 15A is a diagram showing a mosaic pattern declining obliquely from left to right explaining one arrangement of respective colors RGB of a micro color filter used in general.
Figure 15B:
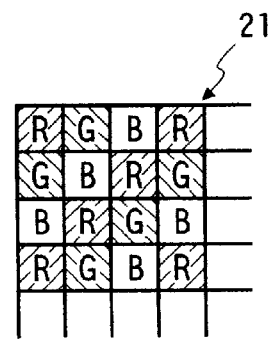
FIG. 15B is a diagram showing a mosaic pattern declining obliquely from right to left explaining one arrangement of respective colors RGB of a micro color filter used in general.
Figure 15C:
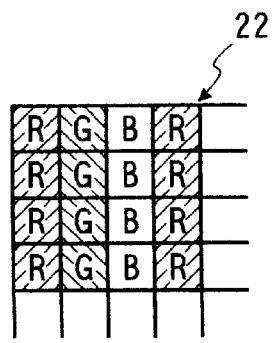
FIG. 15C is a diagram showing a longitudinal stripe pattern explaining one arrangement of respective colors RGB of a micro color filter used in general.
Figure 15D:
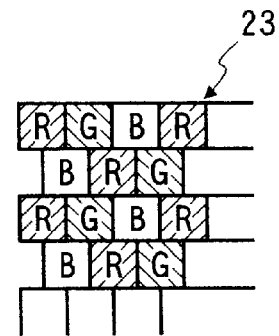
FIG. 15D is a diagram showing a triangle pattern explaining one arrangement of respective colors RGB of a micro color filter used in general.

FIG. 1 shows one structural example of a micro color filter according to the present invention. The micro color filter 30 in this example is mounted in place of a micro color filter 9 of a color liquid crystal panel 2 shown in FIG. 13, thus forming a TFT color liquid crystal display unit P shown in FIG. 2 according to the present invention. In the TFT color liquid crystal display unit P in this example, the same reference numerals are assigned to those components that are the same as those of the TFT color liquid crystal display unit 2 explained previously, and the description of those parts is omitted.

The micro color filter 30 used in this example is rectangular in shape in which a plurality of dots in RGB are arranged vertically and horizontally as shown in FIG. 1, the color arrangement in the micro color filter is made so as to be distributed almost uniformly over the entire display frame, and two dots G, two dots B and two dots R are arranged in sequence repeatedly in the arrangement in one horizontal line corresponding to the identical scanning line. Thus, in the micro color filter 30 in this example, respective dots of RGB are arranged in a state that two each are adjoining each other in horizontal lines.

Furthermore, the arrangement in one longitudinal line along the identical signal line is formed in a pattern so that GRB is repeated in a line starting from the dot G, BGR is repeated in a line starting from the dot B and RBG is repeated in a line starting from the dot R.

Figures 12A, 12B, 12C, 12D:
FIG. 12A is a diagram showing driving voltage distribution of the first field of the first frame explaining an inversion driving system at time of interlaced driving.
FIG. 12B is a diagram showing driving voltage distribution of the second field of the first frame explaining the inversion driving system at time of interlaced driving.
FIG. 12C is a diagram showing driving voltage distribution of the first field of the second frame explaining the inversion driving system at time of interlaced driving.
FIG. 12D is a diagram showing driving voltage distribution of the second field of the second frame explaining the inversion driving system at time of interlaced driving.

Arrangement states of polarities of driving voltage when inversion driving shown in FIG. 12 is performed in interlaced driving in the 480-line TFT liquid crystal panel P using the micro color filter 30 having the above-mentioned structure are shown in FIGS. 3A, 3B, 3C and 3D. Paying particular attention to a pixel G having high visibility, the black-painted portion indicates positive write and the portion of mark ○ indicates negative write. However, since driving voltage having different polarity is written in adjacent dots in the same color, mutual transmittance variations are offset each other, and a display state that oblique stripes cannot appear is presented. Thus, it becomes possible to make generation of oblique stripes inconspicuous by using the micro color filter 30 in this example.

Figure 4:
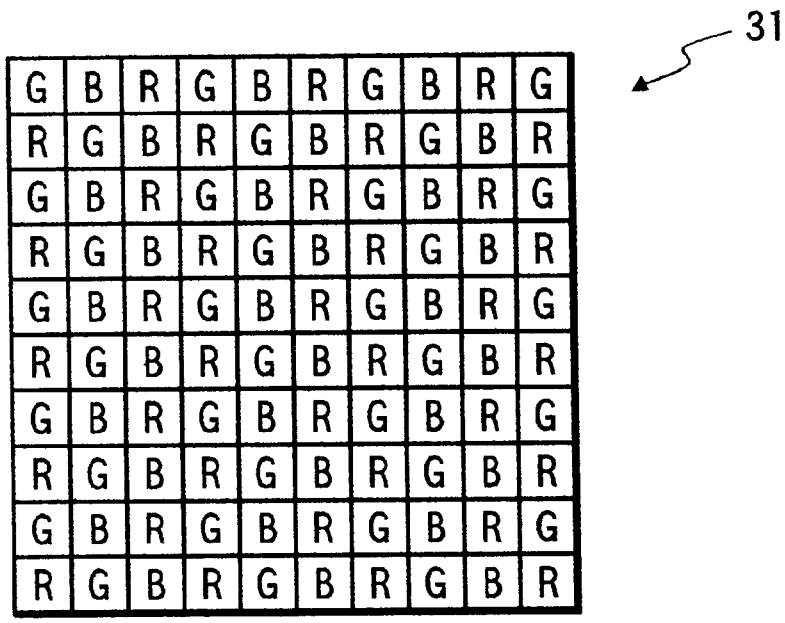
FIG. 4 is a plan view showing another example of a micro color filter according to the present invention.
Figure 6:
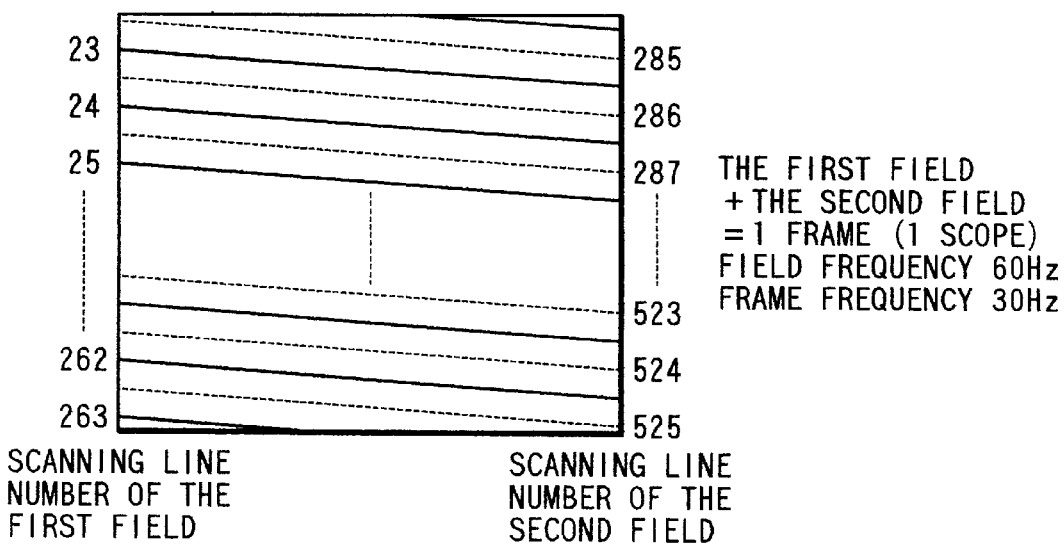
FIG. 6 is a diagram explaining an interlaced driving state in television display of the NTSC system.
Figure 7:
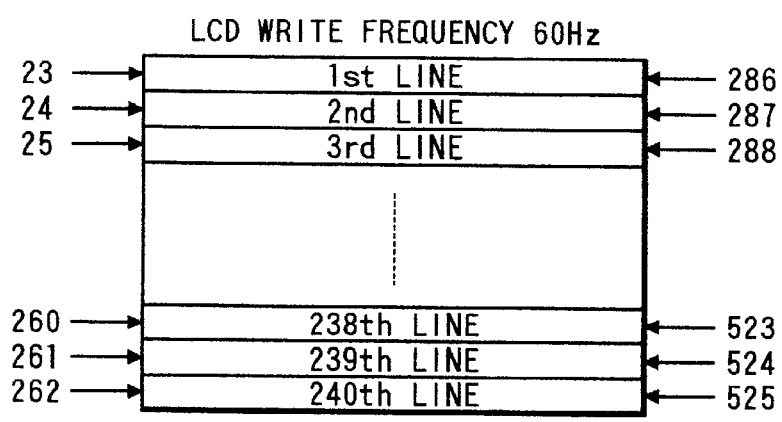
FIG. 7 is a diagram showing a write state in the case of a signal write frequency of 60 Hz in single line sequential driving of a 240-line liquid crystal display unit.
Figure 8:
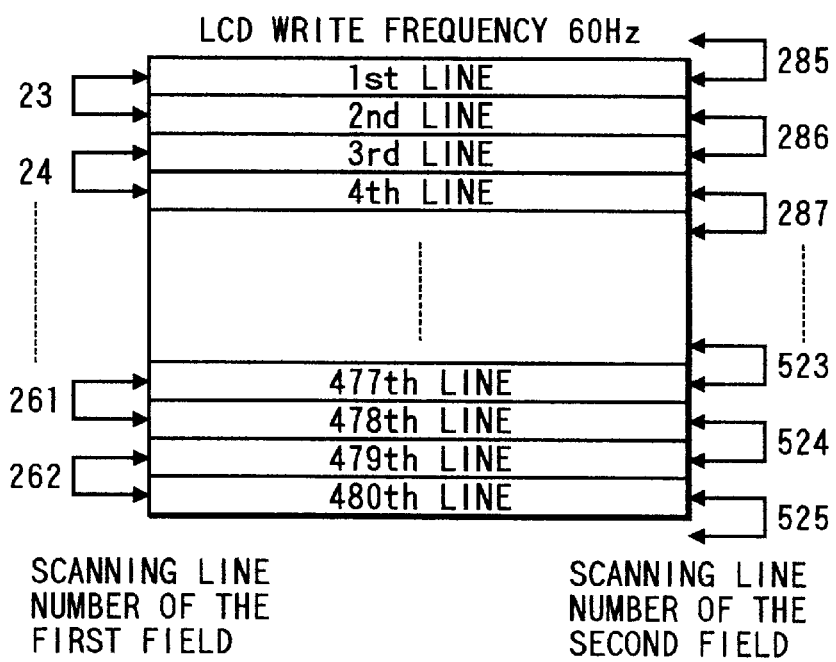
FIG. 8 is a diagram showing a write state in the case of a signal write frequency of 60 Hz in double speed line sequential driving of a 480-line liquid crystal display unit.
Figure 9:
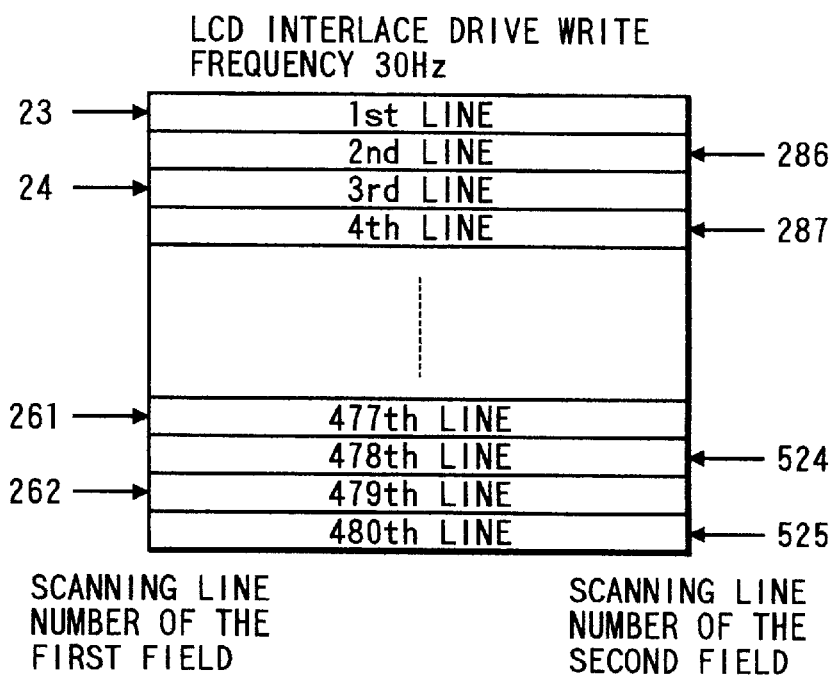
FIG. 9 is a diagram showing a write state in the case of a signal write frequency of 30 Hz in interlaced driving of the 480-line liquid crystal display unit.

FIG. 4 shows another structural example of a micro color filter according to the present invention. The micro color filter 31 of this example is mounted in place of the micro color filter 9 of the color liquid crystal panel 2 shown in FIG. 13, thus forming a device equivalent to the TFT color liquid crystal display unit P shown in FIG. 2 according to the present invention. In the TFT color liquid crystal display unit of this example, the same components as those of the TFT color liquid crystal display unit 2 explained previously are assigned with the same reference numerals, and the description of those components is omitted.

The micro color filter 31 of this example is rectangular in shape in which a plurality of dots in RGB are arranged vertically and horizontally as shown in FIG. 4, and the color arrangement of the micro color filter is distributed almost uniformly over the entire display frame. Also, in the arrangement of one horizontal line corresponding to the identical scanning line, in odd-numbered lines from the top are arranged dots G, dots B and dots R in a repetitive order, and, in even-numbered lines from the top, the drawing up sequence of the dots in three colors is shifted by one line from the drawing up sequence of the dots in the odd-numbered lines. Accordingly, arrangement is made repeatedly in the sequence of GBR from the left side in the odd-numbered lines, whereas arrangement is made repeatedly in the sequence of RGB from the left side in the even-numbered lines.

Arrangement states of driving voltage polarities when inversion driving shown in FIG. 12 is performed with interlaced driving in a 480-line TFT liquid crystal panel P using the micro color filter 31 having the structure mentioned previously are shown in FIGS. 5A, 5B, 5C and 5D. The black painted portion indicates positive write and the portion with mark ○ indicates negative write, but the dots having different driving voltage polarities depending on positive and negative write are distributed uniformly at approximately equal intervals, thus presenting a display state that oblique stripes cannot appear. Thus, it is possible to make generation of oblique stripes inconspicuous by using the micro color filter 31 of this example.

In the micro color filter shown in FIG. 4, although the dots in odd-numbered lines are arranged in the sequence of GBR and the dots in even-numbered lines are arranged being shifted by one from the dots in the odd-numbered lines, the arrangement sequence of the dots in odd-numbered lines produces the same effect both in the sequence of BGR and the sequence of RGB. Further, since the arrangement state in the even-numbered line changes with the arrangement in the odd-numbered line, it is possible to show a variety of configurations in the present invention, and it is a matter of course that the present invention is not limited to the configuration shown in FIG. 3.

As described above, according to the present invention, there is provided a TFT color liquid crystal display unit driven interlacedly, in which a micro color filter having colors different for every dot is used, the color arrangement thereof is uniform in all, and the nearby dots in the same color are driven by driving voltage having different polarities, thus making it possible to make oblique stripes inconspicuous.

Further, since driving voltage having different polarities is written to adjacent dots in the same color by arranging two each dots in the same color successively with respect to the identical scanning line, mutual transmittance variations are offset, thus making it possible to make oblique stripes inconspicuous.

Furthermore, when the drawing up sequence of dots in three colors along alternate identical scanning lines is the same, and the drawing up sequence of dots in three colors along remaining alternate identical scanning lines is arranged being shifted by one line from the above-mentioned drawing up sequence along alternate identical scanning lines, the positive write dots and the negative write dots can be distributed uniformly at equal spaces on the frame. Thus, it is possible to make oblique stripes inconspicuous.

What is claimed is:

1. A color liquid crystal display unit comprising:
   a first substrate;
   a second substrate disposed over the first substrate;
   a thin-film transistor (TFT) circuit provided on the first substrate, said TFT circuit including scanning lines and signal lines wired in a matrix form, and a plurality of TFTs and associated pixel electrodes are provided along horizontal rows such that adjacent pixel electrodes in each horizontal row are separated by one signal line, and along vertical columns separated such that adjacent pixel electrodes in each vertical column are separated by one scanning line;
   a common electrode formed on the second electrode,
   a micro color filter provided on the second electrode, said micro color filter including a plurality of color filter portions arranged in rows and columns corresponding to said pixel electrodes such that each color filter portion is formed over an associated one of said pixel electrodes, each color filter portion being either red, green or blue;
   liquid crystal material disposed between the substrates; and
   an interlaced driving system connected to said scanning lines and signal lines, said interlaced driving system generating driving signals for producing an image on said color liquid display unit such that each frame is divided into a first field and a second field, the scanning lines are sequentially scanned such that odd-numbered scanning lines are scanned in the first field and even-numbered scanning lines are scanned in the second field,
   wherein the color filter potions on said micro color filter are arranged such that each horizontal row aligned parallel to the scanning lines includes a first green color filter portion, a second green color filter portion located immediately adjacent said first green color filter portion, a first blue color filter portion located immediately adjacent said second green color filter portion, a second blue color filter portion located immediately adjacent said first blue color filter portion, a first red color filter portion located immediately adjacent said second blue color filter portion, and a second red color filter portion located immediately adjacent said first red color filter portion, and
   wherein said interlaced driving system includes means for driving said TFTs such that the pixel electrodes associated with said first and the color filter portions for the horizontal rows repeating after two intervening horizontal rows second green color filter portions and associated with an odd-numbered scan line are driven in the first field with driving voltages having opposite polarities.

2. A color liquid crystal display unit according to claim 1, wherein repetitive units formed by the sequence of a green color filter portion, a red color filter portion, and a blue color filter portion are sequentially arranged along each vertical column.

3. A color liquid crystal display unit comprising:

a first substrate;

a second substrate disposed over the first substrate;

a thin-film transistor (TFT) circuit provided on the first substrate, said TFT circuit including scanning lines and signal lines wired in a matrix form, and a plurality of TFTs and associated pixel electrodes are provided along horizontal rows such that adjacent pixel electrodes in each horizontal row are separated by one signal line, and along vertical columns separated such that adjacent pixel electrodes in each vertical column are separated by one scanning line;

a common electrode formed on the second substrate, a micro color filter provided on the second substrate, said micro color filter including a plurality of color filter portions arranged in rows and columns corresponding to said pixel electrodes such that each color filter portion is formed over an associated one of said pixel electrodes, each color filter portion being either red, green or blue;

liquid crystal material disposed between the substrates; and an interlaced driving system connected to said scanning lines and said signal lines, said interlaced driving system generating driving signals for producing an image on said color liquid display unit such that each frame is divided into a first field and a second field, the scanning lines are sequentially scanned such that odd-numbered scanning lines are scanned in the first field and even-numbered scanning lines are scanned in the second field, wherein the color filter portions on said micro color filters are arranged such that each horizontal row aligned parallel to the scanning lines includes a first green color filter portion, a first blue color filter portion located immediately adjacent said first green color filter portion, and a first red color filter portion located immediately adjacent said first blue color filter portion, and arranged such that a first vertical column aligned in parallel with said signal lines includes said first green color filter portion, a first nongreen color filter portion located immediately below said first green color filter portion, a second green color filter portion located immediately below said first non-green color filter portion, and a second non-green color filter portion located immediately below said second green color filter portion, wherein both said first and second non-green color filter portions are either blue or red, and wherein said interlaced driving system includes means for driving said TFTs such that the pixel electrodes associated with said first and second green color filter portions and associated with sequential odd-numbered scan lines are driven in the first field with driving voltages having opposite polarities.

* * * * *

UNITED STATES PATENT AND TRADEMARK OFFICE
CERTIFICATE OF CORRECTION

PATENT NO.    : 6,327,008 B1
DATED         : December 4, 2001
INVENTOR(S)   : Tatsumi Fujiyoshi It is certified that error appears in the above-identified patent and that said Letters Patent is hereby corrected as shown below:

Column 8,
Line 32, delete "potions" and substitute -- portions -- in its place.
Line 47, immediately after "first" insert -- , -- (comma).

Column 9,
Line 2, before "sequence" insert -- repetitive --.

Signed and Sealed this

Thirtieth Day of July, 2002

*Attest:*

*Attesting Officer*

JAMES E. ROGAN
*Director of the United States Patent and Trademark Office*